June 15, 1948.   B. F. TERRY   2,443,281
DOCUMENT CONVEYER

Filed Aug. 24, 1945   2 Sheets-Sheet 1

INVENTOR.
BENNETT F. TERRY.
BY
Van Deventer + Grier
ATTORNEYS.

June 15, 1948. B. F. TERRY 2,443,281
DOCUMENT CONVEYER
Filed Aug. 24, 1945 2 Sheets-Sheet 2

INVENTOR.
BENNETT F. TERRY.
BY
ATTORNEYS.

Patented June 15, 1948

2,443,281

UNITED STATES PATENT OFFICE 2,443,281

DOCUMENT CONVEYER

Bennett F. Terry, Stamford, Conn.

Application August 24, 1945, Serial No. 612,319

10 Claims. (Cl. 271—3)

This invention relates to improvements in document conveyors, and has for an object the provision of a document conveyor which engages a document or the like, flattens the same, moves it into the field of the camera to be exposed, moves it out of the field of the camera and releases it.

Another object of the invention is the provision of a document conveyor which includes a plurality of stations, each of which includes a pair of transparent plates carried in hinged relation to each other, and cam means for moving said plates toward and/or away from each other.

A further object of the invention is the provision in a document conveyor of a pair of transparent plates adapted to be rotated about a vertical axis in steps, said plate being operated cyclically: (1) to raise the upper plate while holding the lower one horizontal; (2) to bring both plates together on a horizontal plane with a document therebetween and at the same time to move said document into the field of a camera where the document is photographed; and (3) to move said plates out of the camera field where the lower plate is swung downwardly as the upper one is maintained in a horizontal position, thereby permitting the document to slide off.

Other objects and advantages of the invention will be apparent to those skilled in the art upon a study of the following specification and the accompanying drawings.

Referring to the drawings, which are merely given by way of example to illustrate the invention:

Figure 1:
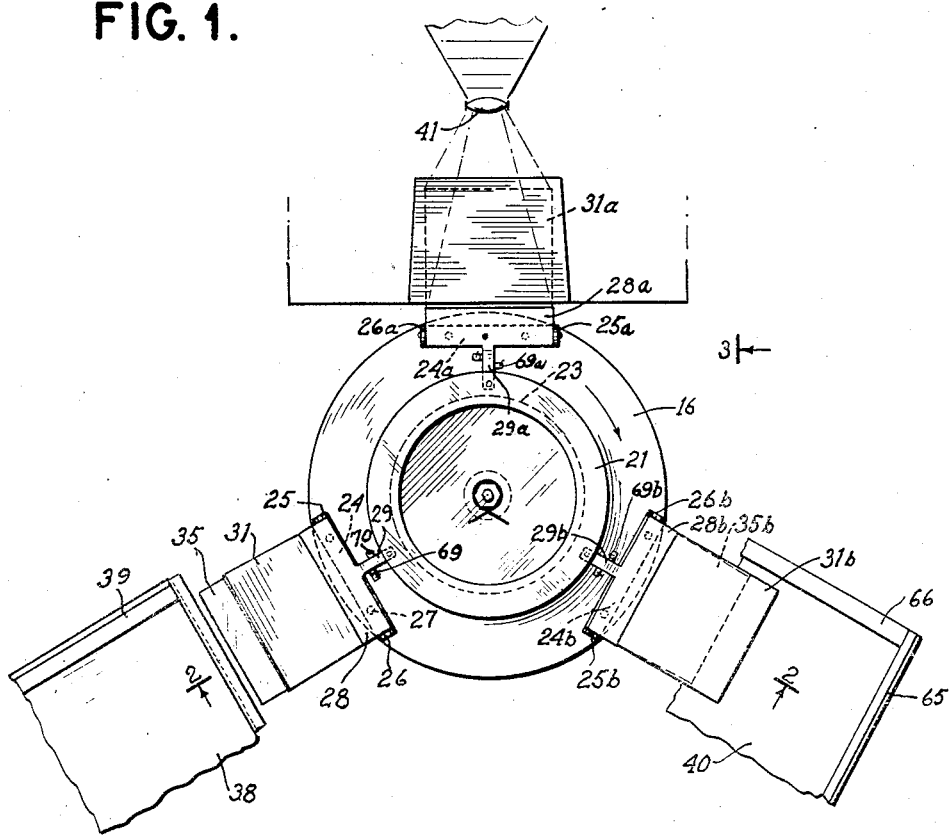
Figure 1 is a plan view of my new and improved document conveyor showing its relation to a feed table, a camera, and a table to receive the documents after they have been photographed.
Figure 2:
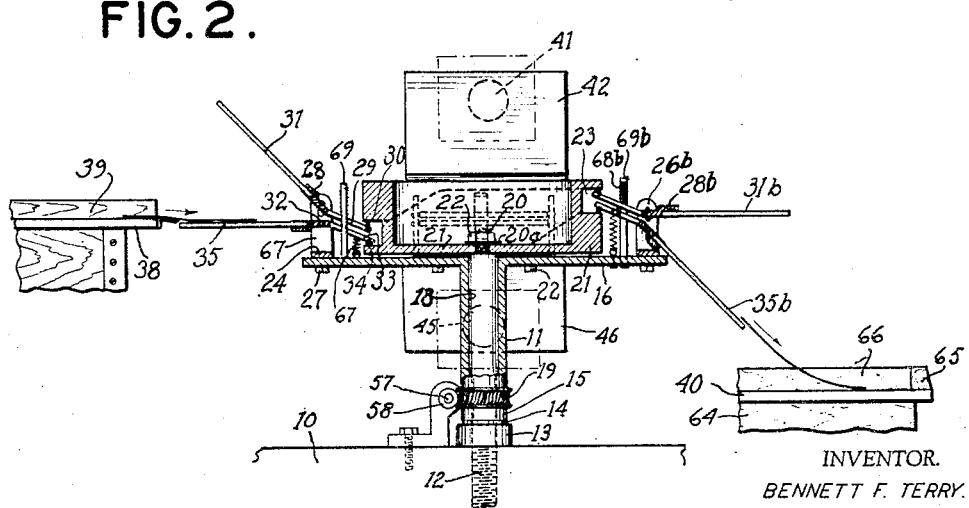
Figure 2 is an elevation partly in section, taken along the lines 2—2 of Figure 1.

Referring first to Figures 1 and 2, a support 10 carries a fixed vertical shaft 11. One example of the mounting shaft 11 is to provide it with a threaded end 12 and screw it into a tapped hole in the support 10. A collar 13 having an internally threaded hole engaging the threads 12 on the shaft 11 may be employed to lock the shaft in the support.

Bearing against the upper end of the collar 13 is a washer 14, and seated on the washer 14 is a thrust bearing 15. A circular plate 16 may have formed integral therewith a hub 17, the interior bore 18 of which forms a working fit on the shaft 11. Secured to the lower end of the hub 17 is a worm gear 19.

The shaft 11 has a shank 20 formed on its upper end, and centrally mounted on the shank 20 is a cup-shaped member 21. A washer 20ª is positioned on the shank 20 and a nut 22 threadedly engages the end of the shank 20 and rigidly secures the cup-shaped member 21 on the shaft 11. A key 36 engaging the shaft 11 and the cup-shaped member 21 prevents said member from moving relative to the shaft 11. Between the plate 16 and the cup-shaped member is a washer 37.

Formed in the periphery of the cup-shaped member 21 is a groove 23 which forms a follow-cam.

Secured to the plate 16 near the periphery thereof is a bracket 24 having vertical legs 25 and 26. Bolts 27 extending through the plate 16 engage and secure the bracket 24 thereto.

Pivotally mounted in aligned holes in the legs 25 and 26 is a bar 28 having an arm 29 extending therefrom and lying on a radial line extending from the center of the plate 16 through the center of the bracket 24. The arm 29 extends into the groove or follow-cam 23 and carries roller means 30 to reduce the friction between the arm 29 and the surface of the follow-cam. The edge of the bar 28 opposite that from which the arm 29 extends is offset upwardly. A transparent rectangular plate 31 is secured to this offset by means of screws.

Spring means 68 having one end connected to the arm 29 extends upwardly and has its other end connected to a bracket 69 so that the spring 68 may at all times urge the arm 29 upwardly and maintain its roller means 30 in contact with the upper surface of the follow-cam groove 23.

Pivotally mounted in aligned holes formed in the legs 25 and 26 and positioned below the bar 28 is a similar bar 32. The bar 32 has an arm 33 paralleling the arm 29 and carrying roller means 34 to reduce the friction between the arm 33 and the follow-cam 23. The bar 32 is offset downwardly and a second transparent rectangular plate 35 is secured to the offset by means of screws so that when the bars 28 and 32 are swung together by the follow-cam, the plates 31 and 35 may flatten the sheet or document before moving the same into the field of the camera as will presently be described. The aligned holes in the arms 25, 26 may be elongated vertically so that documents or sheets thicker than ordinarily encountered may be accommodated.

The arm 33 carries a lug 70 to which the upper end of a spring 67 is secured. The lower end of the spring is secured to the support 16 so that the spring 67 may at all times urge the roller means 34 in contact with the lower surface of the follow-cam groove 23.

The position of the plates 31 and 35 shown in Figure 1 may be termed the loading position, and a suitable support 38 may be provided and positioned adjacent to said loading position. The support 38 may be provided with a guide strip 39 against which the ends of the documents 40 may bear as they are being fed between the plates 35 and 31.

The plate 16 may carry angularly displaced from the bracket 24, a second bracket 24a which is identical with the bracket 24, and angularly displaced from the bracket 24a is a third bracket 24b which is identical with the brackets 24 and 24a.

Although I show only three brackets, and consequently three stations, it is obvious that any desired number of stations may be employed without departing from the spirit of the invention, as it would merely be positioning the brackets on the movable support 16 in any desired relation.

Since the bars, the arms, and the plates carried on the bars are identical to those described in connection with the loading stage, the description of these parts need not be herein repeated. Accordingly, those parts positioned in the camera field (which is the second stage) are given the same numerals as those in the loading stage with the addition of the letter "a," and like parts in the third, or unloading, stage are given the same numerals followed by the letter "b."

Means (not shown) may be provided for moving the support 16 in the direction of the arrow shown in Figure 1 in steps of 120° each. This may be done by any well known means, for example, by means of a Geneva movement.

Figure 3:
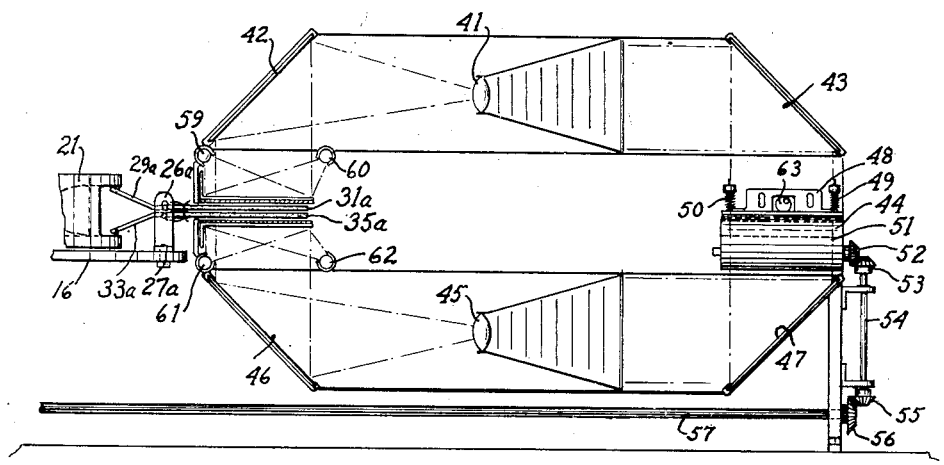
Figure 3 is an elevation partly in section showing one stage of the document conveyor when the same is positioned in the field of the camera, the camera being shown by way of example as arranged to photograph both the upper and the lower faces of the documents.

The second position is in the field of a camera which is indicated diagrammatically in Figure 3 and, although any camera may be employed, I prefer to use one of the type which may photograph both the upper and lower surfaces of the document. This offers several advantages, in the saving of time, the saving in the number of times the document must be handled, and I have the further advantage of being able to enlarge or reduce the photographic image of matter appearing on either side of the document without affecting the size of the matter appearing on the opposite side.

Referring to Figure 3, the camera, which is similar to the camera disclosed in my co-pending application Serial Number 534,011, filed May 4, 1944, for Cameras, now Patent No. 2,391,044, dated December 18, 1945, employs a lens 41 which receives the image of the upper face of the document via a mirror 42. The image from the lens 41 passes via a mirror 43 to one face of a light-sensitive medium 44. A lens 45 receives the image of the lower surface of the document in the camera field via a mirror 46, and this image is reflected by means of a mirror 47 to the opposite light sensitive surface of the medium 44. The film gate carrying the light sensitive medium 44 includes a pressure plate 48 exerting pressure on the medium under the urge of springs 49 and 50.

A roller 51 engages the medium 44 and advances it in time with the movement of the plates 35 and 31 passing from one stage to the other. One way of driving the roller 51, for example, may be to mount the miter gear 52 on the shaft of the roller. A miter gear 53 carried on one end of a shaft 54 meshes with the miter gear 52. A miter gear 55 carried on the other end of the shaft 54 meshes with a miter gear 56 which is carried on one end of the shaft 57. The other end of the shaft 57 may carry a worm 58 which meshes with the worm gear 19 (Figure 2). The upper surface of the document in the camera field may be illuminated by means of lamps 59 and 60, said lamps being provided with suitable reflectors to prevent light from shining directly into the lens 41, and the lower surface of the document may be illuminated by means of lamps 61 and 62 provided with suitable reflectors to prevent light from shining directly on the lens 45. To facilitate loading the camera with a light sensitive web 44, the plate 48 has cooperating therewith a cam 63 which may be rotated to withdraw the plate from the film gate against the urge of the springs 49 and 50. After the camera has been loaded, the cam 63 may be rotated to its normal position (which is the position shown in Figure 3).

A support 64 may be positioned adjacent to the third or unloading stage, and this support may carry guide strips 65 and 66 to facilitate the stacking of the documents as they are unloaded from the document conveyor.

Operation

The operator places a stack of documents 40 on the support 38 with their end edges in contact with the guide 39. The plates 31 and 35 at the loading stage are open, as shown in Figure 2, the plate 35 being horizontal to receive the document. As the support 16 is rotated from the loading position to the camera field (wherein the plate 31 is in the position 31a) the plates 31 and 35 are closed together and held in a horizontal plane due to the shape of the follow-cam 23. This flattens the document so that every portion of its upper surface will lie on the focal plane of the lens 41, and every portion of its lower surface will lie in the focal plane of the lens 45.

If it were desired to enlarge the image of the material appearing on the lower surface of the document for example, the lens 45 would be moved to the left as seen in Figure 3, and at the same time the support carrying the mirrors 46 and 47 would be moved in a direction to move the mirror 46 away from the document and the mirror 47 away from the sensitized medium 44.

On the other hand, if it is desired to reproduce the matter on both sides in the same relation, the lenses would remain in the positions shown in Figure 3.

With the document in the camera field, the next step is to make the exposure, and this may be done in several well known ways. However, I prefer to make the exposures by illuminating both surfaces of the document for a predetermined time element.

After the document has been exposed, the plates 31 and 35 are advanced from the position 31a to the position 31b by rotating the support 16 through an arc of another 120°. During this movement the plate 31b remains horizontal and the plates 35b swings downwardly to a position angular with respect to the plate 31b, thereby permitting the document to slide off and fall upon the support 64. One edge of the document is guided by the guide strip 66 and the document comes to rest with its edge against the guide strip 65 and thereby the photographed documents are stacked.

With this arrangement, documents may be rapidly fed to the plates in the receiving position and they are automatically moved around to the photographing position and thence to the discharge position.

Although I have herein shown and described, by way of example, an embodiment of my new and improved document conveyor, it is obvious that many changes may be made in the arrangements herein shown and described without departing from the spirit of the invention as defined in the following claims.

What is claimed is:

1. In a document conveyor, a support adapted to be advanced along a plane in steps with points of rest therebetween, a pair of transparent plates carried by said support normally disposed in a horizontal plane, means cooperating with said plates for moving the upper of said plates upwardly as they are approaching a first point of rest where a document may be placed on the lower of said plates, said means being adapted to move said upper plate downwardly to clamp said document between the plates during the next of said steps whereby said document is firmly clamped between the plates at the point of rest following this step, said means also being adapted to swing the lower of said plates to an inclined position during the third of said steps, thereby releasing the document and allowing it to slide off of said lower plate.

2. A document conveyor according to claim 1 in which said plates are advanced along said plane in a curved path.

3. In a document conveyor, a support, a pair of hinged transparent plates carried on said support and normally lying in a horizontal plane, means adapted to advance said plates along said plane in steps with points of rest between each of said steps, means partly on said plates and partly at rest adjacent to said support for swinging the upper of said plates upwardly during a first of said steps so that the lower plate may receive a document during a first point of rest, said last means being adapted to swing said upper plate downwardly to clamp the document between said plates during a second of said steps and before a second period of rest, said means also being adapted to hold the upper of said plates horizontally and incline the lower of said plates during a third of said steps.

4. In a document conveyor, a turret forming a support, a pair of plates at least one of which is transparent pivotally carried on said support and adapted to be moved in a series of steps on a plane cutting the axis of said turret, means cooperating with said plates and adapted to separate them by swinging the upper plate upwardly and holding the lower plate horizontal to receive a document during one of said steps, said means also being adapted to bring said plates together in a horizontal plane as they come to rest at the end of a second step, and said means being further adapted to lower the lower one of said plates while holding the upper one horizontal during another of said steps to dispose of the document.

5. In a document conveyor, a support including a vertical shaft, means to rotate said support on a plane in a series of steps, a pair of horizontally disposed hinged transparent plates carried on said support, means for swinging the upper of said plates from said plane and thereby separating said plates before they come to rest at the end of a first step in said series, means to deliver a document to the upper surface of the lower of said plates, means for moving said upper plate downwardly, thereby bringing said plates together to clamp the document therebetween on said plane during the second step in said series, said plates being adapted to come to rest at the end of said second step, and means for separating said plates by swinging the lower of said plates downwardly by the time they reach the end of a third step in said series, thereby permitting the document to fall out.

6. In a document conveyor, a support including a vertical shaft, horizontally disposed means to rotate said support on a plane in a series of steps, a pair of hinged transparent plates carried on said support and movable therewith, each of said plates carrying an actuating arm, cam means cooperating with said actuating arms for; swinging the upper of said plates upwardly thereby separating said plates before they come to rest at the end of a first step in said series, for swinging said upper plate downwardly, thereby bringing said plates together in order to clamp a document therebetween on said plane during the second step in said series, and for swinging the lower of said plates downwardly, thereby separating said plates with the lower one inclined by the time they reach the end of the third step in said series; means to deliver a document between said plates during said first step, said plates coming to rest with a document clamped between them at the end of said second step, and said document being adapted to fall from between said plates at the end of the third step.

7. In a document conveyor, a turret rotatable on a plane in a series of steps, a pair of hinged transparent plates carried on said turret and movable therewith, means on said turret cooperating with said plates for; raising the upper of said plates and thereby separating said plates before they come to rest at the end of a first step in said series, for bringing said plates together in order to clamp a document therebetween on said plane during the second step in said series, and for separating said plates with the lower one inclined by the time they reach the end of the third step in said series; means to deliver a document between said plates during said first step, said plates with the document therebetween coming to rest on said plane at the end of said second step, said document being adapted to fall from between said plates at the end of the third step as said lower plate is inclined.

8. In a document conveyor, a turret rotatable on a plane in a series of steps, a pair of hinged transparent plates carried on said turret and movable therewith, each of said plates carrying an actuating arm, cam means on said turret cooperating with said arms for; swinging the upper of said plates upwardly and thereby separating said plates before they come to rest at the end of a first step in said series, for bringing said plates together in order to clamp a document therebetween on said plane during the second step in said series, and for separating said plates with the lower one inclined by the time they reach the end of the third step in said series; means to deliver a document between said plates during said first step, said plates coming to rest on said plane with the document clamped between them at the end of said second step, and said document being adapted to fall from between said plates as the lower plate is inclined as aforesaid at the end of the third step.

9. In a document conveyor, a turret forming a support, a plurality of pairs of hinged transparent plates carried in angular relation on said support on a common plane, means to move said support in a series of steps, said plates having rest positions between each step and said steps being equal to the spacing of said pairs of plates, means cooperating with said plates serially as said support is moved; for swinging the upper plates upwardly and thereby separating said plates during the first step in said series and before they reach the first rest position, for bringing said plates together and clamping a document therebetween during the next step in said series, and for separating said plates with the lower one inclined by the time the third rest position is reached; means for delivering documents between said plates during the first step, said plates coming to rest on said plane with a document clamped between them at the end of the second step, and said document being adapted to fall from between the plates at the end of the third step.

10. In a document conveyor, a turret forming a support, a plurality of pairs of hinged transparent plates carried in spaced angular relation in a common plane on said support, means to move said support in a series of steps, said plates having rest positions between each step and said steps being equal to the spacing of said pairs of plates, means cooperating with said plates serially as said support is moved; for raising the upper of each set of plates, thereby separating said plates during the first step in said series and before they reach the first rest position, bringing said plates together and clamping a document therebetween during the next step in said series, and for separating said plates with the lower one inclined by the time the third rest position is reached; means for delivering documents between said plates during the first step, said plates coming to rest on said plane at the end of the second step, and said documents being adapted to fall from between the plates at the end of the third step.

BENNETT F. TERRY.

REFERENCES CITED

The following references are of record in the file of this patent:

UNITED STATES PATENTS

| Number | Name | Date |
| --- | --- | --- |
| 1,472,989 | Parkes | Nov. 6, 1923 |
| 1,748,489 | McCarthy et al. | Feb. 25, 1930 |
| 1,970,381 | Landrock | Aug. 14, 1934 |
| 2,001,598 | Caps et al. | May 14, 1935 |
| 2,185,233 | Stuart | Jan. 2, 1940 |